United States Patent [19]

Studer

[11] 4,027,212
[45] May 31, 1977

[54] THREE PHASE FULL WAVE DC MOTOR DECODER

[75] Inventor: Philip A. Studer, Silver Spring, Md.

[73] Assignee: The United States of America as represented by the Administrator of the National Aeronautics and Space Administration, Washington, D.C.

[22] Filed: June 3, 1975

[21] Appl. No.: 583,486

[52] U.S. Cl. .............................. 318/138; 318/254; 318/227

[51] Int. Cl.² ...................................... H02K 29/00

[58] Field of Search .......... 318/138, 171, 227, 254

[56] References Cited

UNITED STATES PATENTS

| | | | |
|---|---|---|---|
| 3,483,458 | 12/1969 | Kirk | 318/138 |
| 3,749,991 | 7/1973 | Kuniyoshi | 318/171 X |
| 3,806,783 | 4/1974 | Lodochnikov et al. | 318/254 X |
| 3,866,099 | 2/1975 | Bourbeau | 318/138 |
| 3,900,780 | 8/1975 | Tanikoshi | 318/138 X |

*Primary Examiner*—Gene Z. Rubinson
*Attorney, Agent, or Firm*—Ronald F. Sandler; John R. Manning

[57] ABSTRACT

A three phase decoder for DC motors is disclosed which employs an extremely simple six transistor circuit to derive six properly phased output signals for fullwave operation of DC motors. Six decoding transistors are coupled at their base-emitter junctions across a resistor network arranged in a delta configuration. Each point of the delta configuration is coupled to one of three position sensors which sense the rotational position of the motor. A second embodiment of the invention is disclosed in which photo-optical isolators are used in place of the decoding transistors.

8 Claims, 6 Drawing Figures

4,027,212

THREE PHASE FULL WAVE DC MOTOR DECODER

BACKGROUND OF THE INVENTION

1. Field of the Invention

The present invention relates generally to motor decoding circuits and more particularly to a simplified three phase fullwave decoding circuit for DC motor commutation.

2. Description of the Prior Art

A large number of DC motor control and commutation systems are known at the present time. For example, attention is directed to U.S. Pat. Nos. 3,585,474 (Kobayashi, et al.), 3,590,353 (Kobayashi et al.) and 3,735,216 (Uemura), all of which disclose a first general type of known motor control systems. In particular, these references disclose half-wave commutation systems which inherently do not require decoding, but are lacking in certain performance characteristics. More specifically, such half-wave commutation systems are ordinarily characterized by a large torque ripple and a relatively low power efficiency. Thus, while these systems are quite simple and require a minimum of circuitry, their performance particularly at low speeds is often inadequate for devices such as magnetic tape drives, servo motors and the like, which require smooth and uniform output characteristics over wide speed ranges.

Other motor control devices having a 180° ON time are also known, as disclosed for example in U.S. Pat. Nos. 3,720,856 (Bregeault) and 3,746,941 (Ageev et al.). Although these devices have improved torque characteristics relative to the half-wave commutation systems described above, they still experience a significant torque ripple particularly at low speeds, and are relatively inefficient in terms of power consumption.

A further category of motor control circuits is known in which torque and power characteristics are significantly improved relative to the two types of devices described above. However, these devices have generally required complicated logic switching networks to provide driving signals of the proper phase relationship and duration to provide the desired smooth torque performance over a wide range and the desired high power efficiency. Unfortunately, the complicated circuitry required by these systems has rendered them subject to failure due to the large number of components required, and has rendered them undesirably expensive for use in all but the most sophisticated type of systems.

Accordingly, a need exists for an improved three phase, full-wave DC motor decoding circuit of simple design which provides maximum performance in terms of smooth motor torque and power efficiency.

SUMMARY OF THE INVENTION

Accordingly, one object of the present invention is to provide an improved three phase full-wave DC motor decoder circuit.

Yet another object of the present invention is the provision of an improved three phase DC motor decoding circuit of greater simplicity than was known in the past.

Yet another object of the present invention is the provision of a novel three phase DC motor decoder for providing uniform motor torque over wide speed ranges and maximum power efficiency.

A still further object of the present invention is the provision of a unique six element DC motor decoding circuit for greatly improved efficiency and greatly simplified design.

Briefly, these and other objects of the present invention are achieved by the provision of a six element circuit, each element of which is coupled to two points of a resistor network arranged in a delta configuration. Each of the three points of he delta configuration is coupled to a conventional position sensor of a DC electric motor. The outputs of the six decoding elements are coupled to a power switching bridge for the purpose of controlling the elements of the power switching bridge which in turn supply power to a DC motor. The output signals derived by the decoding circuit from the delta resistive network provide properly phased signals for operating the power switching bridge in a manner which provides optimum torque and performance characteristics.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
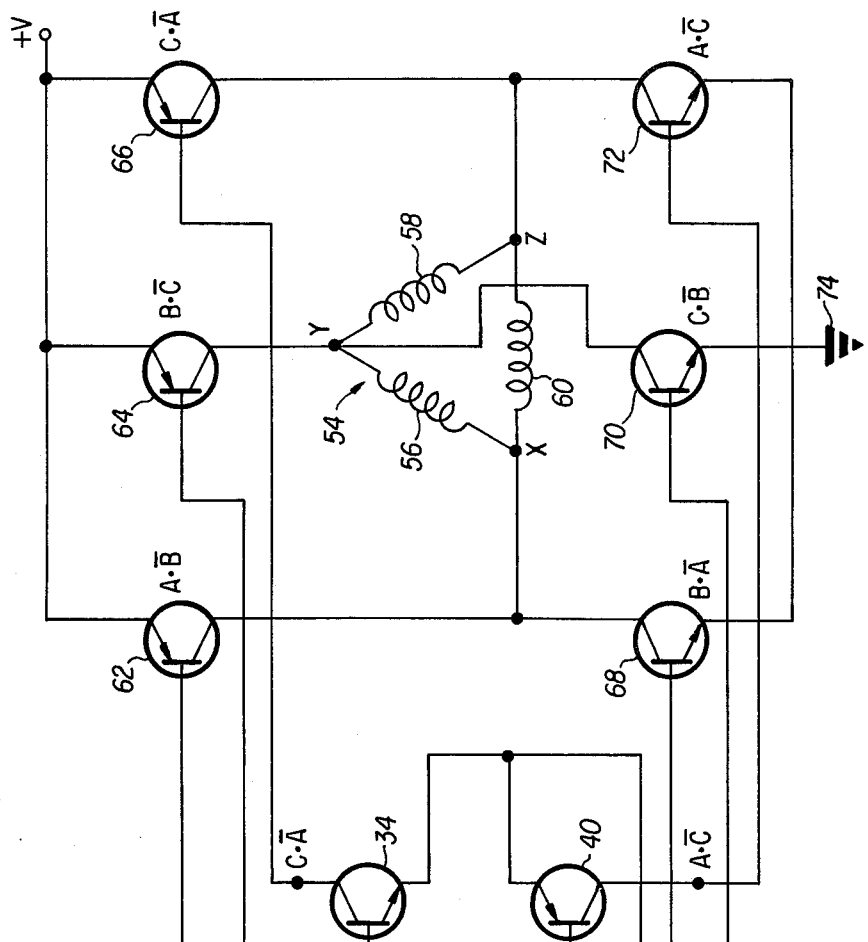
FIG. 1 is a schematic circuit diagram of a first embodiment of the circuit of the present invention.
Figure 1:
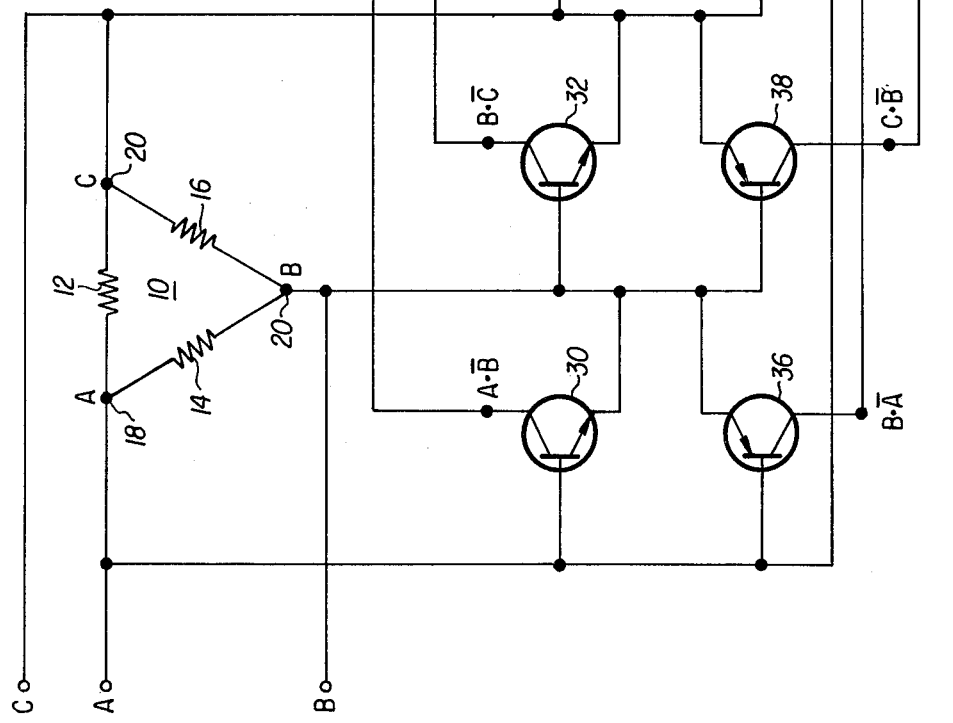
Figure 2:
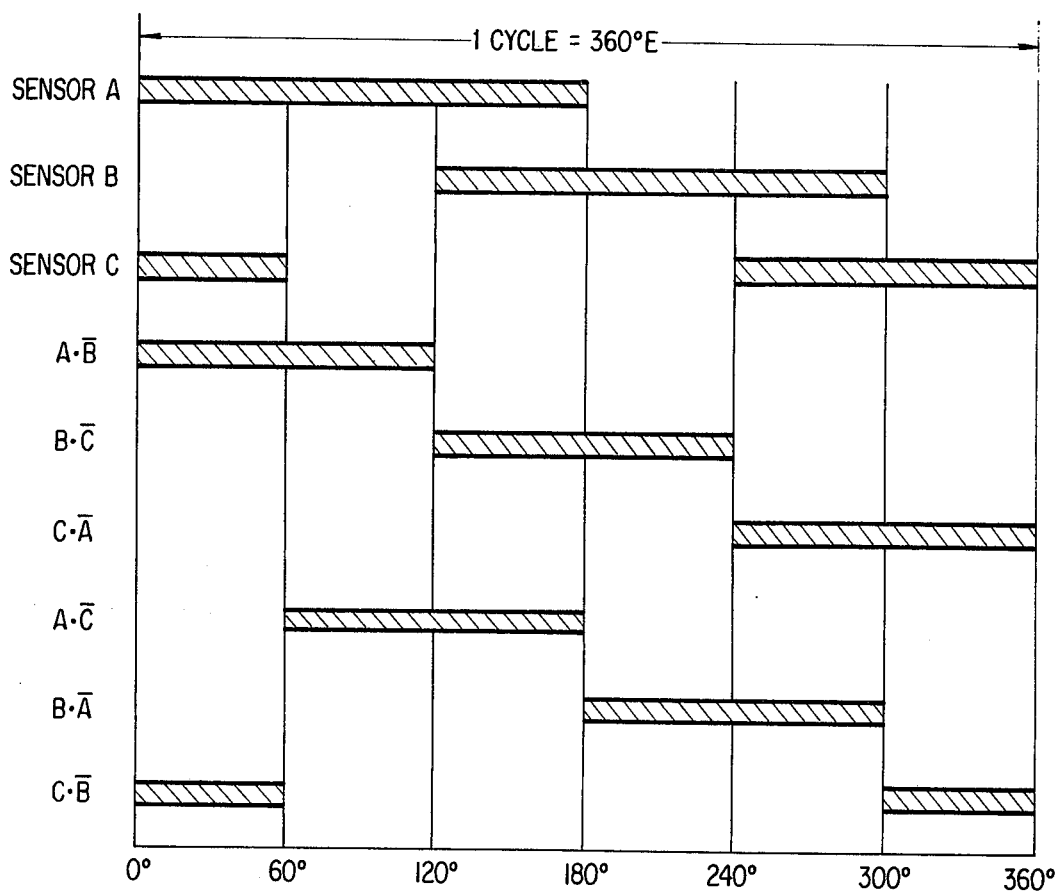
FIG. 2 is a switching diagram illustrating the angular switching interval of the various components illustrated in FIG. 1.

Referring now to the drawings, wherein like reference numerals designate identical or corresponding parts throughout the several views, and more particularly to FIG. 1 thereof, the decoding circuit of the present invention is illustrated in the form of a schematic diagram. More particularly, FIG. 1 illustrates a triangular or delta resistor configuration 10 comprised of three resistors 12, 14 and 16. The resistors 12 and 14 are coupled together at a junction point 18, while the resistors 14 and 16 are coupled together at a junction point 20 and the resistors 12 and 16 are coupled together at a junction point 22. The three junction points 18, 20, and 22 are respectively coupled to terminals A, B and C adapted to be coupled to conventional devices for sensing the angular position of a rotating electric motor. these angular position sensors may be any of a large variety of conventional types including photo-optical, hall effect and resolver devices. Regardless of what type of device is used, these angular position sensors generally provide an alternating output having equal "ON" and "OFF" increments. This binary signal is illustrated in FIG. 2 wherein the ON interval of the sensor coupled to the terminal A is designated by a shaded block 24, and the ON intervals of the sensors coupled to the terminals B and C are respectively illustrated by shaded blocks 26 and 28, the latter being divided into two segments. The sensor signals are applied to the appropriate terminals of the delta resistor circuit 10.

A group of six decoding transistors 30 through 40 are coupled in a differential mode of the delta resistor configuration 10. The differential coupling is achieved by connecting the base-emitter junction of each of the transistors across one resistor in the delta circuit 10. More particularly, the base-emitter junction of the transistor 30 is coupled across the resistor 14, the base-emitter junction of the transistor 32 is coupled across the resistor 16 and the base-emitter junction of the transistor 34 is coupled across the resistor 12. Similarly, the base-emitter junction of the transistor 36 is coupled across the resistor 14, the base-emitter junction of the transistor 38 is coupled across the resistor 16 and the base-emitter junction of the transistor 40 is coupled across the resistor 12. The interconnections described above between the decoding transistors and the delta resistor circuit provide a transition from the binary sensor output signals to signals of differing phase relationship to provide the desired drive signals to drive a full-wave, three phase motor winding. One of the unique aspects of the present invention is that in the illustrated arrangement the properly phased output signals are found to occur automatically when the potential gradient between any pair of the junction points 18, 20 and 22 is observed. The potential gradient between any two terminals exists for 120° and reverses directions each cycle. Between each reversal in direction a 60° interval occurs in which a neutral condition exists. These signals are readily resolved into the six required motor driving signals by the interconnection network illustrated in FIG. 1 which is sensitive to the potential gradient rather than to the absolute potential level existing at the junction points. That is, the base-emitter connection of the position sensing transistors provides a gradient sensitive switching function.

The switching sequences of the decoding transistors 30 through 40 are also illustrated in FIG. 2 by a group of shaded blocks 42 through 52, the block 52 having two separated segments. It will be noted by reference to FIG. 1 that a logical function such as A·B̄, B·C̄, etc. are indicated adjacent the various decoding transistors. These conventional symbols illustrate the switching logic of the decoding transistors and are the symbols used in FIG. 2 to represent the switching of the various decoding transistors. As is known to those skilled in the art, the symbol A·B̄ represents the logical sum of A with the negative of B. In FIG. 2, this sum is represented by the shaded block 42 and represents a 120° interval during which the decoding transistor 30 is ON. Similarly, the other shaded blocks 44 through 52 represent equivalent logic sums for the other decoding transistors, indicating that each of the decoding transistors is switched ON for a different 120° interval, and further indicating that these 120° intervals are all overlapping. As will be apparent from FIG. 2 therefore, the circuit arrangement of FIG. 1, including the six decoding transistors coupled to the delta resistor circuit, provides six properly phased motor driving signals of the required angular duration.

Referring again to FIG. 1, motor windings 54 arranged in a delta configuration are shown and include three separate windings 56, 58 and 60. The windings 56 and 60 are jointed at a junction point X, the windings 56 and 58 are jointed at a junction point Y and the windings 58 and 60 are joined at a junction point Z.

A power switching bridge comprising six transistors 62 through 66 and 68 through 72 is provided for supplying power to the motor windings 54. In particular, the power switching transistors in the power switching bridge are individually coupled at their collector electrodes to the various junction points of the motor windings 54. Specifically, the collector electrodes of the transistors 62 and 68 are coupled to the junction point X, the collector electrodes of the transistors 64 and 70 are coupled to the junction point Y, and the collector electrodes of the transistors 66 and 72 are coupled to the junction point Z. The emitter electrodes of the transistors 62, 64 and 66 are all coupled to a suitable positive potential source V, which may be on the order of 28 volts for example. Similarly, the emitter electrodes of the transistors 68, 70 and 72 are all coupled to a reference potential such as ground 74.

The base electrode of each of the transistors 62 through 66 and 68 through 72 is coupled to the collector electrode of one of the previously described decoding transistors 30 through 40. More particularly, the transistor 62 is coupled to the transistor 30, the transistor 64 is coupled to the transistor 32, the transistor 66 is coupled to the transistor 34, the transistor 68 is coupled to the transistor 36, the transistor 70 is coupled to the transistor 38 and the transistor 72 is coupled to the transistor 40. Thus, each of the transistors in the power switching bridge is rendered conductive for the same interval as the corresponding transistor in the decoding network. These intervals are thus clearly shown in FIG. 2.

Figure 3:
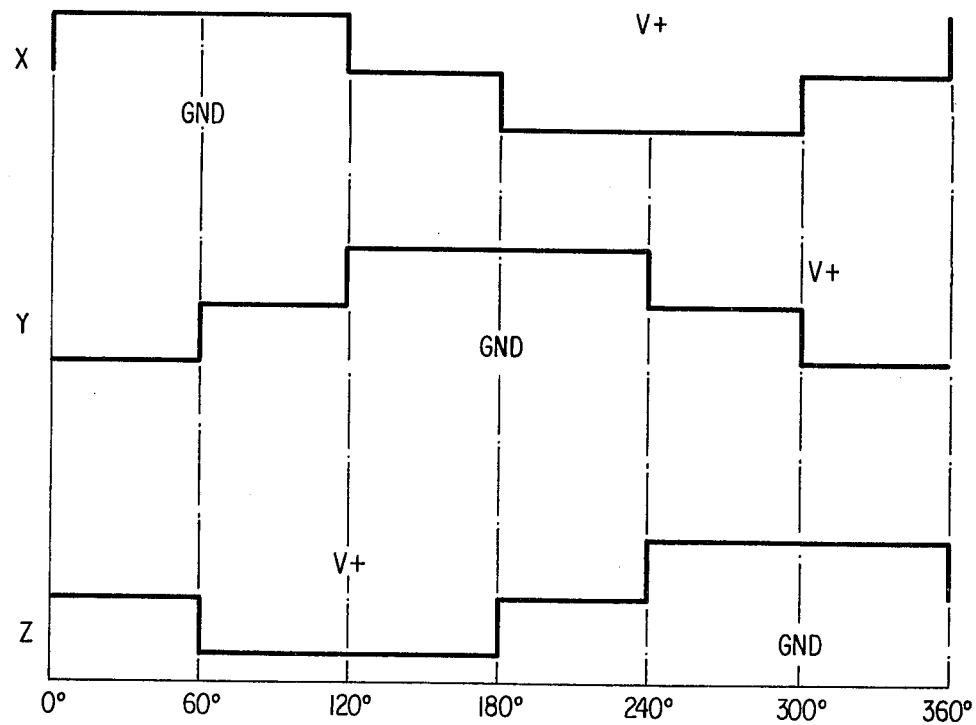
FIG. 3 is a potential diagram illustrating the angular application of driving potential to the motor coils of the circuit illustrated in FIG. 1.

FIG. 3 illustrates the motor potentials at the junction points X, Y and Z resulting from the actuation of the power switching bridge by the decoding transistors. As shown in this FIGURE, the potential at the junction X rises to plus V at 0° and remains at this potential for 120°. The potential at this point then drops to an intermediate potential between V and ground between 120° and 180°, then drops to ground potential between 180° and 300°, after which it rises again to the intermediate potential for the interval between 300° and 360°. The potentials at the other junction points Y and Z cycle through similar potential excursions in appropriately phased relationships determined by the phase relationships of the decoding transistors. The resultant potentials applied to the motor windings cause extremely smooth and uniform motor performance for providing the desired uniform output torque and high power efficiency through a very wide range of motor speeds.

A further advantage of the illustrated circuitry is an automatic transition from the low voltage levels associated with conventional position sensor and logic devices to the higher voltage and current characteristics of the power bridge without need for extra components, since the decoding transistors provide a stage of amplification. Thus the circuit arrangement of the present invention is especially efficient in that it requires a minimum number of components to accomplish its desired purpose. Naturally, additional stages of power amplification can be added as required by the load according to standard techniques.

The basic circuit structure of the present invention can be modified for use with all types of sensors having symmetrical output characteristics and the delta resistor network can be modified to include reactive elements as well as resistive elements. Furthermore, virtually any type of potential gradient semiconductor decoding element such as thyristors can be used in place of the illustrated transistors.

Figure 4:
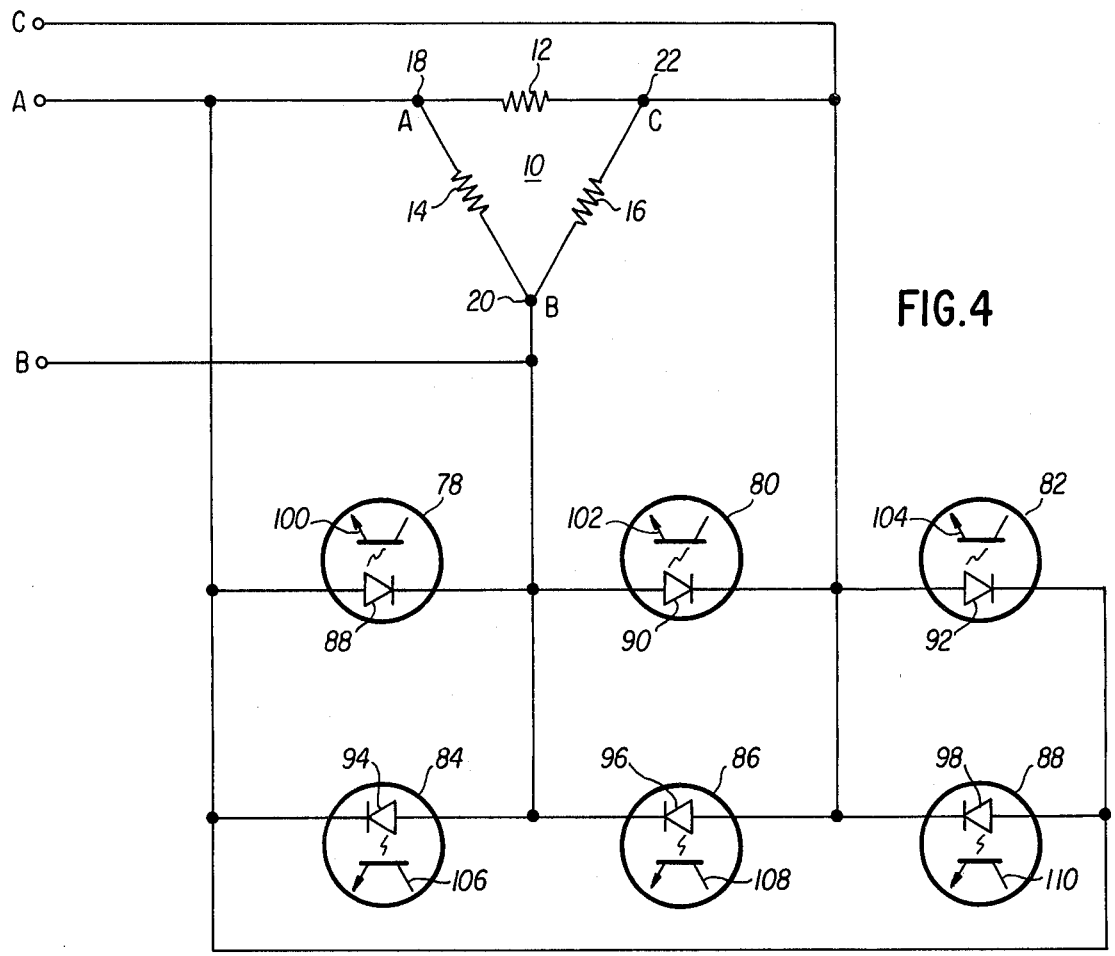
FIG. 4 is a schematic diagram of a second embodiment of the decoding circuit of the present invention.

FIG. 4 illustrates a second embodiment of the invention in which the decoding transistors 30 through 40 are replaced by photo-optical isolators 78 through 88. The photo-optical isolators are conventional four terminal devices including a light emitting diode and a photo-transistor. The light signal emitted by the light emitting diode acts as the equivalent of a base current to trigger the photo-transistor. The advantage of this arrangement is that the photo-transistor and the light emitting diode are completely isolated electrically, and thus may, be in entirely separate circuits operating at different power levels.

Figure 5:
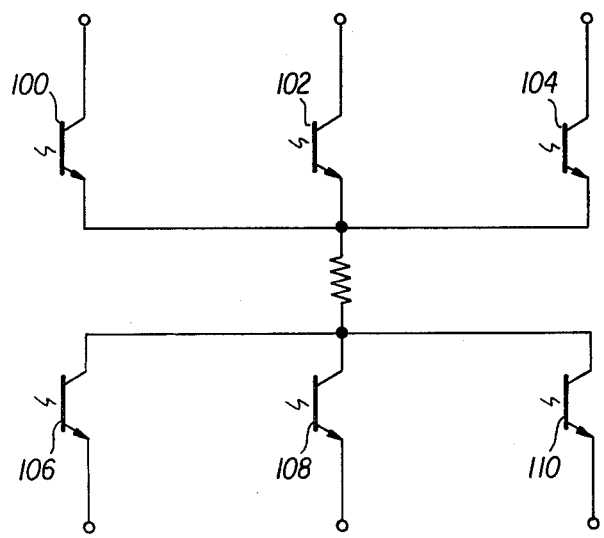
FIG. 5 is a schematic diagram of the interconnection of phototransistors utilized in the decoding circuit of FIG. 4.

Referring again to FIG. 4, the illustrated circuit includes six light emitting diodes coupled across the three resistors in the delta resistor configuration 10. These diodes are coupled across individual resistors in the same manner as the decoding transistors 30 through 40 discussed previously. Each of the light emitting diodes 88 through 98 controls a corresponding photo-transistor 100 through 110. These photo-transistors are electrically isolated from the light emitting diodes and are preferably interconnected in a circuit of the type illustrated in FIG. 5. The free electrodes of the photo-transistors, as illustrated in FIG. 5, may then be coupled to a power switching bridge of the type illustrated in FIG. 1 for controlling the energization of a motor in exactly the same manner as the circuit of FIG. 1.

One advantage of the photo-optical isolator circuit illustrated in FIG. 4 is that it is completely bidirectional so that, in contrast to the apparatus of FIG. 1, it responds equally well to motor rotation in either direction. Accordingly the apparatus of FIG. 4 could be used to advantage with bidirectional motors having bidirectional position sensors such as magnetoresistors and in conjunction with a motor without having a reversible power supply. A secondary advantage is the fact that the light emitting diodes and the photo-transistors are electrically isolated and may operate at different power levels, facilitating the conversion from sensor or logic signal levels to driving signal levels.

Figure 6:
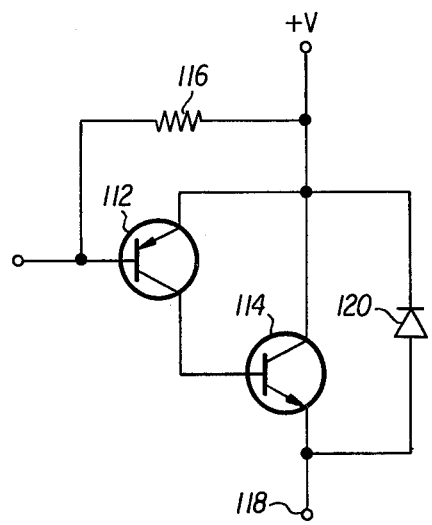
FIG. 6 is an illustration of a portion of a motor driving circuit utilizing increased power amplification that can be used in place of a portion of the circuit illustrated in FIG. 1.

FIG. 6 illustrates a simple amplifying circuit that can be used in a power switching bridge of the type illustrated in FIG. 1 to amplify motor driving power. In particular, each of the individual transistors illustrated in the power switching bridge of FIG. 1 may be replaced by an amplifying circuit of the type illustrated in FIG. 6. The amplifying circuit of FIG. 6 includes a first transistor 112 which is coupled at its collector electrode to the base electrode of a second transistor 114. The emitter electrode of the transistor 112 is coupled to a potential source illustrated at plus V and is also coupled through a biasing resistor 116 to its base electrode. Similarly, the emitter electrode of the transistor 114 is coupled to an output terminal 118, while the collector electrode thereof is coupled to the emitter electrode of the transistor 112. A protective diode 120 is coupled across the emitter and collector electrodes of the transistor 114.

The previously disclosed circuitry is unique in that it simplifies the commutation logic required to provide six properly phased command signals from three motor positions sensors while simultaneously significantly improving the reliability of electronically commutated DC motors.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A decoding circuit for providing six properly phased control signals for a three phase DC motor having three angular position sensors comprising:
   an impedance circuit having three separate impedance elements coupled together in a delta configuration, each point of said delta configuration adapted to be coupled to one of said angular position sensors of said motor,
   switching circuit means including six electronic switching devices coupled to said impedance circuit such that each electronic switching device is coupled across one of said separate impedance elements for providing an output control signal in response to a specific direction of potential gradient existing across said one impedance element; and,
   output terminal means coupled to said six switching devices for supplying six properly phased motor control signals, said output terminal means adapted to be coupled to a power switching bridge for controlling energization of said motor.

2. A decoding circuit as in claim 1, wherein:
said six switching elements comprise transistors having base, emitter and collector electrodes.

3. A decoding circuit as in claim 2, wherein:
said base and emitter electrodes of each of said transistors are coupled across one of said impedance elements, and said collector electrode of each said transistor is coupled to said output terminal means for providing said motor control signals.

4. A decoding circuit as in claim 3, wherein:
each of said impedance elements is a resistor.

5. A decoding circuit as in claim 1, wherein:
said six switching elements include photo-optical isolator means each comprising a light emitting diode and a photo-transistor.

6. A decoding circuit as in claim 5, wherein:
said light emitting diode of each of said photo-optical isolator means is coupled across one of said impedance elements.

7. A decoding circuit as in claim 6, wherein:
said photo-transistors are coupled to said output terminal means for providing said motor control signals.

8. A decoding circuit as in claim 7, wherein:
each of said impedance elements is a resistor.

* * * * *